US011800856B2

(12) United States Patent
Tan et al.

(10) Patent No.: US 11,800,856 B2
(45) Date of Patent: Oct. 31, 2023

(54) RECIRCULATING AQUACULTURE SYSTEM FOR SHRIMP CULTURE THROUGH SBR WASTEWATER TREATMENT

(71) Applicant: Shanghai Ocean University, Shanghai (CN)

(72) Inventors: Hongxin Tan, Shanghai (CN); Wenchang Liu, Shanghai (CN); Guozhi Luo, Shanghai (CN); Dachuan Sun, Shanghai (CN); Yaning Hao, Shanghai (CN); Shuang Li, Shanghai (CN)

(73) Assignee: Shanghai Ocean University, Shanghai (CN)

(*) Notice: Subject to any disclaimer, the term of this patent is extended or adjusted under 35 U.S.C. 154(b) by 421 days.

(21) Appl. No.: 16/985,166

(22) Filed: Aug. 4, 2020

(65) Prior Publication Data

US 2021/0037796 A1 Feb. 11, 2021

(30) Foreign Application Priority Data

Aug. 5, 2019 (CN) ........................ 201910717956.6

(51) Int. Cl.

*A01K 61/59* (2017.01)
*A01K 63/04* (2006.01)

(Continued)

(52) U.S. Cl.

CPC ............ *A01K 61/59* (2017.01); *A01K 63/003* (2013.01); *A01K 63/04* (2013.01); *A01K 63/042* (2013.01);

(Continued)

(58) Field of Classification Search

CPC ...... A01K 61/59; A01K 63/003; A01K 63/04; A01K 63/042; A01K 63/045;

(Continued)

(56) References Cited

U.S. PATENT DOCUMENTS

2018/0116184 A1 5/2018 Kemp et al.

FOREIGN PATENT DOCUMENTS

CN 104542381 A 4/2015
CN 206909457 U * 1/2018

(Continued)

OTHER PUBLICATIONS

Machine-generated English translation of CN 208924991, generated on Mar. 27, 2023.*

(Continued)

*Primary Examiner* — Fred Prince

(57) ABSTRACT

The present invention discloses a recirculating aquaculture system (RAS) and method for shrimp culture through SBR wastewater treatment. The RAS includes a control cabinet, culture tanks, a clean water tank, a clean water filling pipeline, a drainage pipeline, a buried activated sludge tank and a solid-liquid separation mechanism. The solid-liquid separation mechanism comprises a sludge pump, an input pipe, a plate and frame type filter press and a liquid output pipe. An input end of the sludge pump is immersed in sewage of the buried activated sludge tank; and a clean water output end of the plate and frame type filter press is connected with the buried activated sludge tank through the liquid output pipe.

6 Claims, 2 Drawing Sheets

(51) Int. Cl.

| | |
|---|---|
| ***C02F 3/12*** | (2023.01) |
| ***A01K 63/00*** | (2017.01) |
| ***C02F 1/12*** | (2023.01) |
| *C02F 11/122* | (2019.01) |

(52) U.S. Cl.
CPC .......... *A01K 63/045* (2013.01); *A01K 63/047* (2013.01); *C02F 3/1263* (2013.01); *C02F 11/122* (2013.01); *C02F 2209/10* (2013.01); *C02F 2209/15* (2013.01); *C02F 2209/42* (2013.01); *C02F 2209/44* (2013.01); *Y02A 40/81* (2018.01); *Y02W 10/10* (2015.05)

(58) Field of Classification Search
CPC ... A01K 63/047; C02F 3/1263; C02F 11/122; C02F 2209/10; C02F 2209/15; C02F 2209/42; C02F 2209/44; Y02A 40/81; Y02W 10/10
USPC ................ 210/167.01, 194, 195.1, 196, 903; 119/204, 211
See application file for complete search history.

(56) References Cited

FOREIGN PATENT DOCUMENTS

| | | | |
|---|---|---|---|
| CN | 107667956 A | | 2/2018 |
| CN | 208924991 U | * | 6/2019 |

OTHER PUBLICATIONS

Machine-generated English translation of CN 206909457, generated on Mar. 27, 2023.*
Machine-generated English translation of CN 104542381, generated on Mar. 27, 2023.*

* cited by examiner

RECIRCULATING AQUACULTURE SYSTEM FOR SHRIMP CULTURE THROUGH SBR WASTEWATER TREATMENT

CROSS-REFERENCE TO RELATED APPLICATIONS

This application claims the benefit of priority from Chinese Patent Application No. CN201910717956.6 filed on Aug. 5, 2019. The content of the aforementioned application, including any intervening amendments thereto, is incorporated herein by reference in its entirety.

TECHNICAL FIELD

The present invention relates to the field of aquatic science, in particular to a recirculating aquaculture system (RAS) and method for shrimp culture through SBR (Sequencing Batch Reactor) wastewater treatment.

BACKGROUND OF THE PRESENT INVENTION

At present, the common culture modes of *Penaeus vannamei* include intensive culture in outdoor ponds, intensive culture in greenhouse ponds, culture in higher-place ponds, recirculating aquaculture and the like. In addition, the biofloc culture mode is gradually rising due to advantages in water saving, water quality control, natural bait supply, ecological disease prevention and other aspects.

In the common biofloc culture mode, a large number of suspended biological flocs and *Penaeus vannamei* live in the same unit (culture tank). Bioflocs have excellent water purification ability in the treatment of toxic substances such as ammonia nitrogen in aquaculture water, and can convert the toxic substances into microbial biomass or finally oxidized into nitrate nitrogen through assimilation and/or nitrification. Studies have shown that the culture tank can purify the water through nitrification without adding extra carbon source when low-concentration of bioflocs are maintained in the aquaculture zone. However, with the continuous breeding process and the increase in feeding amount, the concentration of bioflocs (also known as the concentration of total suspended solids (TSS)) in water is increasing; nitrification often occurs; and the concentration of nitrate nitrogen is increasing in water. Studies have shown that the excessive concentration of TSS during cultivation may hinder the breathing and other activities of *Penaeus vannamei*, thereby affecting the growth and even survival of *Penaeus vannamei*; the excessive concentration of nitrate nitrogen will harm physiological and immune functions of *Penaeus vannamei*, causing a decrease in growth rate, susceptibility to disease, growth retardation, decrease in fecundity and survival rate and the like.

Therefore, the removal of excessive TSS and nitrate nitrogen in the common biolofloc culture mode will be more beneficial to the growth of *Penaeus vannamei*.

SUMMARY OF THE PRESENT INVENTION

The purpose of the present invention is to provide a recirculating aquaculture system (RAS) and method for shrimp culture through SBR wastewater treatment. The RAS can well treat TSS and nitrate nitrogen with excessive concentration in culture tanks, and prevent the TSS and nitrate nitrogen with excessive concentration from harming

*Penaeus vannamei* in the culture process due to a buried activated sludge tank is arranged.

The purpose of the present invention is realized as follows: the RAS for shrimp culture through SBR wastewater treatment includes:

a control cabinet;

a plurality of culture tanks;

at least one clean water tank;

a clean water filling pipeline, which is equipped with a circulating water pump and is provided with an input end connected with the clean water tank and a plurality of output ends connected with all the culture tanks one by one;

a drainage pipeline, which is provided with a plurality of input ends connected with all the culture tanks one by one; and an aeration device, which is provided with an air outlet pipeline leading to inner cavities of the culture tanks and the clean water tank.

The RAS for shrimp culture through SBR wastewater treatment further includes:

a buried activated sludge tank; and a solid-liquid separation mechanism for performing solid-liquid separation on sewage in the buried activated sludge tank, wherein the solid-liquid separation mechanism includes a sludge pump, an input pipe, a plate and frame type filter press and a liquid output pipe; the sludge pump and the plate and frame type filter press are controlled by the control cabinet; the input end of the sludge pump is immersed in the sewage of the buried activated sludge tank; the output end of the sludge pump is connected with the input end of the plate and frame type filter press through the input pipe; and a clean water output end of the plate and frame type filter press is connected with the buried activated sludge tank through the liquid output pipe.

Further, the buried activated sludge tank is equipped with a submersible pump controlled by the control cabinet, wherein the input end of the submersible pump is connected with the inner cavity of the buried activated sludge tankand is used for sucking clean water in the buried activated sludge tank; and the output end of the submersible pump is connected with the clean water tank.

Further, a water level sensor connected with the control cabinet is built in the clean water tank, wherein the water level sensor is used for monitoring the water level of the clean water tank.

Further, at least one stirrer controlled by the control cabinet is built in the buried activated sludge tank.

Further, the aeration device is provided with an air supply pipeline leading to the inner cavity of the buried activated sludge tank.

Further, the buried activated sludge tank is equipped with a water quality detector connected with the control cabinet, wherein the water quality detector is used for online monitoring of TSS concentration in sewage.

A recirculating aquaculture method for shrimp culture through SBR wastewater treatment at least includes the following steps:

S1. Culture tanks and a clean water tank are filled with aquaculture water after sand filtration treatment; and then, air is supplied to the aquaculture water in the culture tanks for aeration treatment for 7 days.

S2. *Penaeus vannamei* with proper salinity and no specific pathogen are initially stocked in the culture tanks, wherein the individual weight of *Penaeus vannamei* larvae is greater than or equal to 0.1 g, and the initial stocking density is 500-800 larvae/m$^3$; commercial feed of *Penaeus vannamei* is selected and fed 5-6 times a day; the daily feeding rate is gradually reduced from 10% to 3%; water quality indexes and pathogenic organisms of the RAS for shrimp culture through SBR wastewater treatment are monitored in the 0-12th days of the culture period after the buried activated sludge tank does not work and the aquaculture water is not fed into and drained from the culture tanks; and the preset weight of sodium bicarbonate, calcium chloride and minerals for aquatic products are irregularly added to the clean water tank to regulate and control the pH value of the aquaculture water to be 7.2-8.7 and the content of mineral ions to be greater than or equal to 200 mg/L.

S3. Mature activated sludge is inputted into the buried activated sludge tank on the 13th day of the culture period; the buried activated sludge tank is used to treat the aquaculture water for every 24 hours as a cycle; and the cycle is repeated every day;

wherein step S3 at least includes the following two steps:

S301, the step is a water inflow period; the operation period is from 20:00 on the starting date to 01:00 on the next day; the aquaculture water is taken from the clean water tank by a circulating water pump and sent to each culture tank; and the aquaculture water overflowed from the culture tanks is discharged into the buried activated sludge tank through a drainage pipeline; and S302, the step is a stirring period; the operation period is from 01:00 to 11:00 on the next day; the stirrer is started to stir the aquaculture water in the buried activated sludge tank; and the preset weight of food-grade glucose is put into the aquaculture water in the buried activated sludge tank at 01:30 on the next day.

S4. The step is an aeration period; the operation period is from 11:00 to 16:30 on the next day; an aerator is turned on; and the outputted air enters the aquaculture water of the buried activated sludge tank through a sludge tank oxygenation pipeline;

S5. The step is a settling period; the operation period is from 16:30 to 17:30 on the next day; and the stirrer and the aerator are turned off, so that the treated activated sludge aquaculture water naturally settles.

S6. The step is a drainage period and an idle period; the operation period is from 17:30 to 20:00 on the next day; clean water naturally settled in the buried activated sludge tank is pumped into the clean water tank by the submersible pump; the water level sensor is triggered after the clean water in the clean water tank rises to a working water level, so that the submersible pump is in a closed state; and then the buried activated sludge tank enters into the idle state.

Further, the sludge pump and the plate and frame type filter press are started and stopped irregularly in step S4 in the culture period.

Further, the water quality detector detects the TSS concentration of the aquaculture water in the buried activated sludge tank in step S4. When the TSS concentration of the aquaculture water in the buried activated sludge tank is higher than 2000 mg/L, the sludge pump is started to pump the mixed liquid to the plate and frame type filter press; and the clean water obtained after filter pressing returns to the buried activated sludge tank through the liquid output pipe. When the TSS concentration is lower than 2000 mg/L, the sludge pump is turned off. When the TSS concentration is still not lower than 2000 mg/L at the end of step S4, the sludge pump is turned off at the end of step S4.

The present invention has the beneficial effects that:

1) The buried activated sludge tank is provided so that the TSS and nitrate nitrogen with excessive concentration in the culture tanks can be well treated to prevent the TSS and nitrate nitrogen from harming *Penaeus vannamei* during cultivation; and a certain proportion of the total amount of aquaculture water in the culture tanks is discharged every day, purified in the buried activated sludge tank of SBR, settled and then stored in the clean water tank, and then pumped back to the culture tanks to realize the repeated recycling of aquaculture water;
2) The bioflocs with lower concentration are maintained in the culture tanks, so as to achieve a certain purification ability of the aquaculture water in the culture tanks through nitrification; and then, the TSS and nitrate nitrogen generated in the culture tanks are interactively removed from the buried activated sludge tank according to actual needs of the culture process.

DETAILED DESCRIPTION OF THE PRESENT INVENTION

The present invention will be further described with reference to FIGS. 1-2 and specific embodiments.

Figure 1:
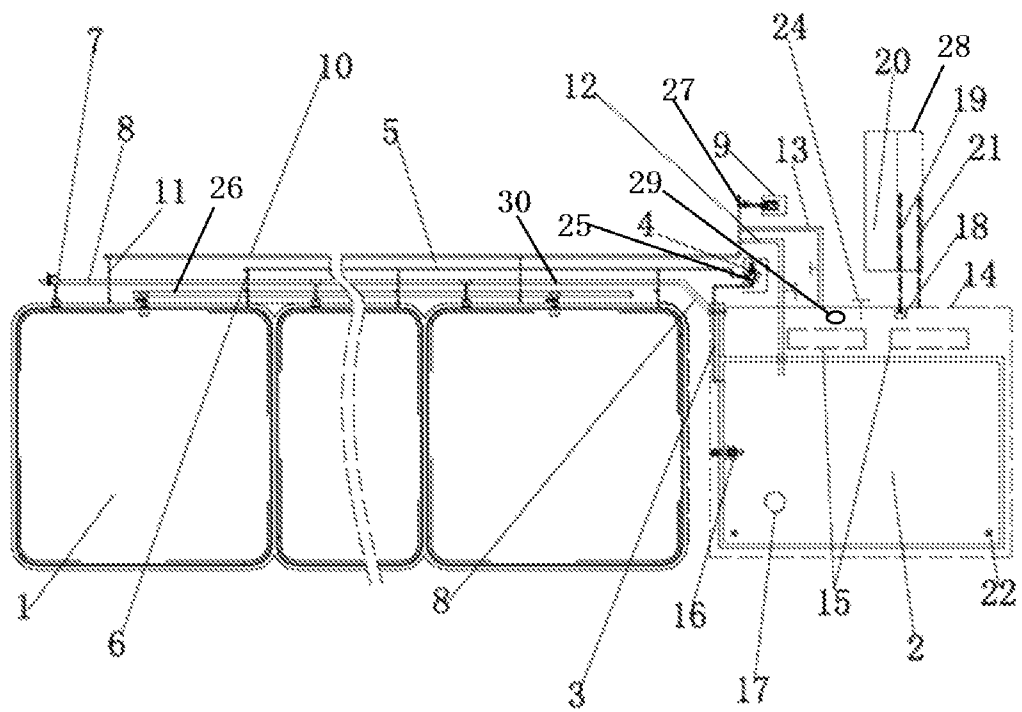
FIG. 1 is a general layout diagram of an RAS for shrimp culture through SBR wastewater treatment in embodiments of the present invention.
Figure 2:
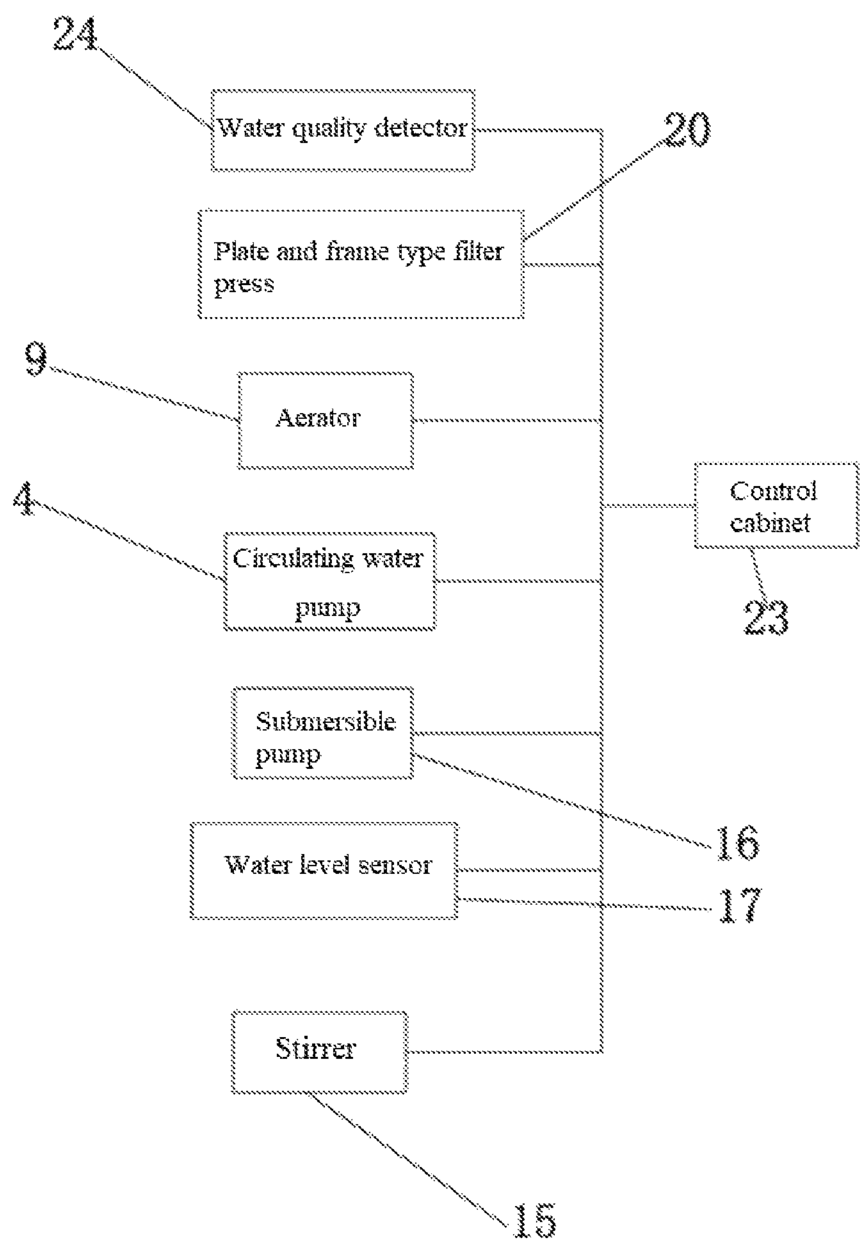
FIG. 2 is a schematic diagram of a main control relationship of an RAS for shrimp culture through SBR wastewater treatment in embodiments of the present invention.

As shown in FIGS. 1-2, an RAS for shrimp culture through SBR wastewater treatment includes:

a control cabinet 23;

a plurality of culture tanks 1;

a clean water tank 2 equipped with an overflow pipe 22;

a buried activated sludge tank 14;

a clean water filling pipeline 25, which is equipped with a circulating water pump 4 and is provided with a water containing pipe 3, a water delivery main pipe 5 and a plurality of water delivery branch pipes 6, wherein the plurality of water delivery branch pipes 6 are respectively connected with a plurality of culture tanks 1; the circulating water pump 4 is controlled by the control cabinet 23; an input end of the circulating water pump 4 is connected with the clean water tank 2 through the water containing pipe 3; and an output end of the circulating water pump 4, the water delivery main pipe 5 and the plurality of water delivery branch pipes 6 are sequentially connected, so that clean water can be delivered to all the culture tanks 1;

a drainage pipeline 26, which is provided with a plurality of drainage branch pipes 7 connected with upper parts of inner cavities of all the culture tanks 1 one by one, and is further provided with a drainage main pipe 8, wherein the input ends of the drainage branch pipes 7 are connected with the upper parts of the inner cavities of the culture tanks 1; the output ends of all the drainage branch pipes 7 are connected with the drainage main pipes 8; and the output end of the drainage main pipe 8 is connected with the buried activated sludge tank 14;

an aeration device 27, which is provided with an air outlet pipeline 30 leading to the inner cavities of the culture tanks 1 and the clean water tank 2; and a solid-liquid separation mechanism 28 for performing solid-liquid separation on sewage in the buried activated sludge tank 14.

The solid-liquid separation mechanism 28 includes a sludge pump 18, an input pipe 19, a plate and frame type filter press 20 and a liquid output pipe 21. The sludge pump 18 and the plate and frame type filter press 20 are controlled by the control cabinet 23; the input end of the sludge pump 18 is immersed in the sewage of the buried activated sludge tank 14; the output end of the sludge pump 18 is connected with the input end of the plate and frame type filter press 20 through the input pipe 19; and a clean water output end of the plate and frame type filter press 20 is connected with the buried activated sludge tank 14 through the liquid output pipe 21. The plate and frame type filter press 20 is a common solid-liquid separation mechanism in the market, which can separate solids from liquid in the sewage and fill relatively clean water sources into the buried activated sludge tank 14. The buried activated sludge tank 14 is equipped with a water quality detector 24 connected with the control cabinet 23, wherein the water quality detector 24 is used for monitoring a TSS concentration in the sewage; and the water quality detector 24 is configured as a TSS monitor. When the TSS concentration is greater than a predetermined value, the plate and frame type filter press 20 should be started to perform solid-liquid separation operation on the sewage in the buried activated sludge tank 14.

The buried activated sludge tank 14 is equipped with a submersible pump 16 controlled by the control cabinet 23. The input end of the submersible pump 16 is connected with the inner cavity of the buried activated sludge tank 14 and is used for sucking the clean water in the buried activated sludge tank 14; and the output end of the submersible pump 16 is connected with the clean water tank 2. A water level sensor 17 connected with the control cabinet 23 is built in the clean water tank 2; and the water level sensor 17 is used for monitoring the water level of the clean water tank 2. The water level sensor 17 is triggered when the water level in the clean water tank 2 reaches the working water level, so that the submersible pump 16 stops working immediately.

Two oppositely arranged stirrers 15 are built in the buried activated sludge tank 14, wherein the stirrers 15 are controlled by the control cabinet 23; and the stirrers 15 are submersible push-flow stirrers.

The aeration device 27 is provided with an air supply pipeline 29 leading to the inner cavity of the buried activated sludge tank 14. The aeration device 27 includes an aerator 9, a culture tank oxygenation main pipe 10, oxygenation branch pipes 11, a clean water tank oxygenation pipe 12 and a sludge tank oxygenation pipe 13. The aerator 9 is controlled by the control cabinet 23; the output end of the aerator 9 sequentially passes through the culture tank oxygenation main pipe 10 and a plurality of oxygenation branch pipes 11 to supply air and oxygen to the aquaculture water in the plurality of culture tanks 1; the output end of the aerator 9 supplies oxygen to the clean water in the clean water tank 2 through the clean water tank oxygenation pipe 12; and the output end of the aerator 9 further supplies oxygen to the sewage in the buried activated sludge tank 14 through the sludge tank oxygenation pipe 13 so as to facilitate the microbial growth and treat pollutants.

In the present embodiment, the culture tanks 1 have a specification of 12 m×12 m×1.6 m; and the total volume of the aquaculture water when the eight culture tanks 1 work is 1600 $m^3$. The culture tanks 1 adopt a water changing mode of pulse flow; the circulating water pump 4 sends the purified aquaculture water from the clean water tank 2 into the culture tanks 1 from 2 hours after feeding the feed at the last meal every day, and works continuously for 5 hours; and the aquaculture water overflowed from the culture tanks 1 flows into the buried activated sludge tank 14. The daily water exchange rate is 10% (about 160 $m^3$) of the total volume of water in the culture tanks 1, so that the culture tanks 1 have bioflocs with the TSS concentration of 100-250 mg/L, and the culture tanks 1 have certain assimilation and/or nitrification as well as corresponding water purification.

A water treatment zone is composed of the buried activated sludge tank 14 (20 m×11 m×3.5 m, 400 $m^3$ of working water), the clean water tank (20 m×8.5 m×3.5 m, 210 $m^3$ of working water) and related auxiliary electrical equipment. The SBR process adopted for wastewater treatment in the RAS for shrimp culture through SBR wastewater treatment is different from the SBR process adopted for treatment of municipal sewage and other wastewater according to the circadian life rhythm and the needs of actual culturing operation of *Penaeus vannamei* in that every 24 hours is a cycle (inflow period 5 hours+stirring period 10 hour+aeration period 5.5 hours+settling period 1 hour+drainage period and idle period 2.5 hours).

A recirculating aquaculture method for shrimp culture through SBR wastewater treatment includes the following steps:

S1. Culture tanks 1 and a clean water tank 2 are filled with saline aquaculture water after sand filtration treatment; and then air is supplied to the aquaculture water in the culture tanks 1 so that the volumes of air outputted from four corners of the culture tanks 1 are basically the same; and the aeration treatment is performed for 7 days.

S2. *Penaeus vannamei* with proper salinity and no specific pathogen are initially stocked in the culture tanks 1, wherein the individual weight of *Penaeus vannamei* larvae is greater than or equal to 0.1 g, and the initial stocking density is 500 larvae/$m^3$; feed of *Penaeus vannamei* is selected and fed 5-6 times a day; the daily feeding rate is gradually reduced from 10% to 3%; water quality indexes and pathogenic organisms of the RAS for shrimp culture through SBR wastewater treatment are monitored in the 0-12th days of the culture period after the buried activated sludge tank 14 does not work and the aquaculture water is not fed into and drained from the culture tanks 1; and the preset weight of sodium bicarbonate, calcium chloride and minerals for aquatic products are irregularly added to the clean water tank 2 to regulate and control the pH value of the aquaculture water to be 7.2-8.7 and the content of mineral ions to be greater than or equal to 200 mg/L.

S3. Mature activated sludge (bioflocs) is inputted into the buried activated sludge tank 14 on the 13th day of the culture period; the buried activated sludge tank 14 is used to treat the aquaculture water on a 24-hour basis; and the cycle is repeated every day, wherein step S3 at least includes the following two steps:

S301, the step is a water inflow period; the operation period is from 20:00 on the starting date to 01:00 on the next day; the aquaculture water is taken from the clean water tank 2 by a circulating water pump 4 and sent to each culture tank 1; and the aquaculture water overflowed from the culture tanks 1 is discharged into the buried activated sludge tank 14 through a drainage pipeline; and S302, the step is a stirring period; the operation period is from 01:00 to 11:00 on the next day; the stirrer 15 is started to stir the aquaculture water in the buried activated sludge tank 14; and the preset weight of food-grade glucose is put into the aquaculture water in the buried activated sludge tank 14 at 01:30 on the next day, wherein when the preset weight of food-grade glucose is put into the aquaculture water of the buried activated sludge tank 14, the putting operation is performed according to the following standards:

the weight of food-grade glucose put at 01:30 on the 13th-28th day of the culture period is 4 kg;

the weight of food-grade glucose put at 01:30 on the 29th-45th day of the culture period is 6 kg;

the weight of food-grade glucose put at 01:30 on the 46th-75th day of the culture period is 8 kg;

the weight of food-grade glucose put at 01:30 on the 75th-90th day of the culture period is 16 kg; and the weight of food-grade glucose put at 01:30 on the 91st-100th day of the culture period is 24 kg.

S4. The step is an aeration period; the operation period is from 11:00 to 16:30 on the next day; an aerator 9 is turned on; and the outputted air enters the aquaculture water of the buried activated sludge tank 14 through a sludge tank oxygenation pipeline 13.

S5. The step is a settling period; the operation period is from 16:30 to 17:30 on the next day; and the stirrer 15 and the aerator 9 are turned off, so that the treated activated sludge aquaculture water naturally settles.

S6. The step is a drainage period and an idle period; the operation period is from 17:30 to 20:00 on the next day; the clean water naturally settled in the buried activated sludge tank 14 is pumped into the clean water tank 2 by the submersible pump 16; the water level sensor 17 is triggered after the clean water in the clean water tank 2 rises to a working water level, so that the submersible pump 16 is in a closed state; and then the buried activated sludge tank 14 enters into the idle state.

Further, the sludge pump and the plate and frame type filter press are started and stopped irregularly in step S4 in the culture period.

The sludge pump 18 and the plate and frame type filter press 20 are started and stopped irregularly in step S4 in the culture period. The aquaculture water after sand filtration treatment is used to supplement the aquaculture water lost in daily operation and evaporation. The water quality detector 24 detects the TSS concentration of water in the buried activated sludge tank 14 in step S4. When the TSS concentration of water in the buried activated sludge tank 14 is higher than 2000 mg/L, the sludge pump 18 is started to pump the mixed liquid into the plate and frame type filter press 20; and the clean water obtained after filter pressing returns to the buried activated sludge tank 14 through the liquid output pipe 21. When the TSS concentration is lower than 2000 mg/L, the sludge pump 18 is turned off. If the TSS concentration is still not lower than 2000 mg/L at the end of step S4, the sludge pump 18 is turned off at the end of step S4.

The TSS and nitrate nitrogen concentrations in the culture tanks 1 are controlled below 216 mg/L and 56 mg/L respectively in the whole culture period.

The above describes the preferred embodiments of the present invention. Those ordinary skilled in the art can also make various transformations or improvements on this basis. These transformations or improvements shall fall within the protection scope of claims of the present invention without departing from the general idea of the present invention.

What is claimed is:

1. A recirculating aquaculture system (RAS) for shrimp culture through SBR (Sequencing Batch Reactor) wastewater treatment, comprising:

a control cabinet;

a plurality of culture tanks;

at least one clean water tank;

a clean water filling pipeline, which is equipped with a circulating water pump and is provided with an input end connected with the clean water tank and a plurality of output ends connected with all the culture tanks one by one;

a drainage pipeline, which is provided with a plurality of input ends connected with all the culture tanks one by one; and an aeration device, which is provided with an air outlet pipeline leading to inner cavities of the culture tanks and the clean water tank, wherein the RAS for shrimp culture through SBR wastewater treatment further comprises:

a buried activated sludge tank; and a solid-liquid separation mechanism for performing solid-liquid separation on sewage in the buried activated sludge tank;

wherein the solid-liquid separation mechanism comprises a sludge pump, an input pipe, a plate and frame type filter press and a liquid output pipe; the sludge pump and the plate and frame type filter press are controlled by the control cabinet; an input end of the sludge pump is immersed in the sewage of the buried activated sludge tank; an output end of the sludge pump is connected with an input end of the plate and frame type filter press through the input pipe; and a clean water output end of the plate and frame type filter press is connected with the buried activated sludge tank through the liquid output pipe.

2. The RAS for shrimp culture through SBR wastewater treatment according to claim 1, wherein the buried activated sludge tank is equipped with a submersible pump controlled by the control cabinet; an input end of the submersible pump is connected with the inner cavity of the buried activated sludge tank and is used for sucking clean water in the buried activated sludge tank; and an output end of the submersible pump is connected with the clean water tank.

3. The RAS for shrimp culture through SBR wastewater treatment according to claim 2, wherein a water level sensor connected with the control cabinet is built in the clean water tank; and the water level sensor is used for monitoring water level of the clean water tank.

4. The RAS for shrimp culture through SBR wastewater treatment according to claim 1, wherein at least one stirrer controlled by the control cabinet is built in the buried activated sludge tank.

5. The RAS for shrimp culture through SBR wastewater treatment according to claim 1, wherein the aeration device is provided with an air supply pipeline leading to the inner cavity of the buried activated sludge tank.

6. The RAS for shrimp culture through SBR wastewater treatment according to claim 1, wherein the buried activated sludge tank is equipped with a water quality detector connected with the control cabinet; and the water quality detector is used for online monitoring of TSS concentration in sewage.

* * * * *